(12) United States Patent
Yoshida (10) Patent No.: US 8,360,724 B2
(45) Date of Patent: Jan. 29, 2013

(54) HORIZONTAL AXIS WIND TURBINE

(75) Inventor: Shigeo Yoshida, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1166 days.

(21) Appl. No.: 12/132,907

(22) Filed: Jun. 4, 2008

(65) Prior Publication Data

US 2008/0304964 A1 Dec. 11, 2008

(30) Foreign Application Priority Data

Jun. 5, 2007 (JP) .................... 2007-149263

(51) Int. Cl.
*F03D 7/02* (2006.01)
*F03D 1/00* (2006.01)
(52) U.S. Cl. ............... 416/41; 416/31; 416/40; 415/4.3
(58) Field of Classification Search ............ 416/31, 416/40, 41
See application file for complete search history.

(56) References Cited

U.S. PATENT DOCUMENTS

| | | | |
|---|---|---|---|
| 7,719,128 B2 * | 5/2010 | Kammer et al. ............ | 290/44 |
| 2006/0002793 A1 * | 1/2006 | Yoshida ..................... | 416/11 |
| 2008/0247875 A1 * | 10/2008 | Yoshida ..................... | 416/95 |
| 2009/0047129 A1 | 2/2009 | Yoshida | |
| 2009/0079192 A1 | 3/2009 | Voss | |
| 2010/0014969 A1 * | 1/2010 | Wilson et al. ............. | 416/1 |

FOREIGN PATENT DOCUMENTS

| | | |
|---|---|---|
| EP | 1 612 412 A2 | 1/2006 |
| WO | WO 2005/116445 A1 | 12/2005 |
| WO | WO 2006/129509 A1 | 12/2006 |

OTHER PUBLICATIONS

Masaaki Shibata et al, "New Concepts for Reducing Design Load," 25th Wind Power Energy Use Symposium, Nov. 20, 2003, pp. 225 to 227, Mitsubishi Jukogyo KK, Japan.
European Search Report dated Oct. 1, 2012 (five (5) pages).

* cited by examiner

*Primary Examiner* — Matthew W Such
*Assistant Examiner* — David Spalla
(74) *Attorney, Agent, or Firm* — Crowell & Moring LLP (57) ABSTRACT

To provide a horizontal axis wind turbine capable of reducing flutter, and by extension, reducing the load on the wind turbine, without controlling the yaw, regardless of the direction of the wind relative to the nacelle. When the wind speed is above a specific value, the yaw angle of the nacelle is held constant, the blade pitch angle is controlled according to the yaw angle Y of the wind direction relative to the nacelle, and the rotor is allowed to rotate freely. Even when the yaw angle of the nacelle is held constant, allowing the rotor to rotate freely makes it possible to reduce the load by avoiding flutter.

11 Claims, 6 Drawing Sheets

HORIZONTAL AXIS WIND TURBINE

CROSS REFERENCE TO RELATED APPLICATIONS

This application claims priority under 35 U.S.C. 119 based upon Japanese Patent Application Serial No. 2007-149263, filed on Jun. 5, 2007. The entire disclosure of the aforesaid application is incorporated herein by reference.

FIELD OF THE INVENTION

The present invention relates to standby control for a horizontal axis wind turbine.

BACKGROUND OF THE INVENTION

As is well known, horizontal axis wind turbines are used extensively in industry. Typical horizontal axis wind turbines comprise a rotor wherein at least two blades are attached extending radially from a hub, a nacelle which supports the rotor on a main axle, which extends in essentially the horizontal direction, and which is connected to the hub, and a turbine holding member such as a tower that is disposed in essentially the vertical direction, and that supports the nacelle so as to be rotatable in the yaw direction. Additionally, horizontal axis wind turbines conventionally have also been provided with yaw driving means that can be controlled to drive the rotation of the nacelle in the yaw direction, and braking means such as yaw brakes for slowing/stopping the yaw rotation and main brakes for slowing/stopping the rotation of the rotor. Horizontal axis wind turbines equipped with means for controlling the blade pitch angle are also used.

Normally the design strength of the turbine is influenced greatly by the load that it will receive when in the standby state during a windstorm. The turbine load during a windstorm must also be set envisioning a concomitant power outage. Additionally, usually the power generation is stopped during a windstorm, so the horizontal shaft wind turbine is idle. In a conventional upwind pitch control device, after feathering has been secured for all blades, the nacelle orientation angle is reversed by approximately 180° by the yaw control and held by a weak yaw brake, to be in standby at the time of the windstorm. (See, for example, non-patent reference 1.) Doing so makes it possible to face the rotor downwind during the windstorm, to thereby reduce the load on the turbine.

Non-patent reference 1: SHIBATA, Masaaki and HAYASHI, Yoshiyuki: "New Concepts for Reducing Design Load," 25$^{th}$ Wind Power Energy Use Symposium, 20 Nov. 2003, Pages 225 to 227

The typical wind turbine of today, including the conventional technology described above, is a pitch-control wind turbine wherein the pitch angle is controlled. This type of wind turbine typically feathers the pitch angle and allows the rotor to rotate freely to go into windstorm standby. When it comes to yaw control, there are those wind turbines wherein yaw is controlled actively, those wherein it is controlled passively, and those wherein it is not controlled at all (held by a yaw brake/yaw worm gear). In any wind turbine wherein yaw control is possible, if the power required for yaw control is interrupted, or when there is a failure in one of the mechanisms relating to the yaw control, there is the possibility that the storm wind can be received from any direction. As a result, it is necessary for the design to envision a windstorm from all directions. Large wind turbines have a greater propensity towards stall flutter. When one envisions the windstorm coming from all directions, there will be large stalling flutters in specific wind directions relative to the nacelle, producing large loads.

The present invention is the result of contemplation of the problem areas with the conventional technology, described above, and the object thereof is to provide a horizontal axis wind turbine capable of reducing flutter, and by extension, reducing the load on the wind turbine, without controlling the yaw, regardless of the direction of the wind relative to the nacelle.

SUMMARY OF THE INVENTION

In order to solve the common problem described above, the invention is a horizontal axis wind turbine having a turbine holding member; a nacelle held by the turbine holding member such that the nacelle is rotatable in a yaw direction; a main axis rotatably supported by the nacelle, having an extended portion extending essentially in a horizontal direction from the nacelle; and a rotor having a hub mounted to the extended portion of the main axis and a blade extending outwardly from the hub; wherein when a wind speed is above a predetermined value, a yaw angle of the nacelle is fixed, so as to control a pitch angle of the blade in accordance with a yaw angle of the wind direction relative to the nacelle, and the rotor is allowed to rotate freely.

According to another aspect of the invention, when the wind speed is less than the predetermined value, in the horizontal axis wind turbine, all blades are controlled to feather.

According to still another aspect of the invention, in the horizontal axis wind turbine, when the wind speed is more than the predetermined value the blade pitch angle is controlled to avoid a concentration of load.

According to yet another aspect of the invention the horizontal axis wind turbine wherein there are three of the blades; and when the wind speed is greater than the predetermined value, a scope of control target values for the pitch angle ranges from a control target value for the pitch angle corresponding to a yaw angle of ±45° for the wind direction relative to the nacelle, to a control target value for the pitch angle corresponding to the yaw angle of ±135°.

It is embodied in still another mode of the invention the horizontal axis wind turbine wherein when the wind speed is greater than the predetermined value, the control target value for the pitch angle corresponding to a yaw angle of ±45° of the wind direction relative to the nacelle is set as the minimum value for the control target value, and the control target value for the pitch angle corresponding to this yaw angle being ±135° is set as the maximum value for the control target value.

BRIEF DESCRIPTION OF THE DRAWINGS

FIGS. 2A.1, B.1, C.1, D.1 and E.1 are plan view schematic diagrams of a horizontal axis wind turbine as set forth in one example of an embodiment according to the present invention, and A.2, B.2, C.2, D.2, and E.2 are blade cross-sectional diagrams;

DETAILED DESCRIPTION OF THE PREFERRED EMBODIMENTS

The present invention has the effect of being able to reduce flutter, and by extension, to reduce the load on the wind turbine, without controlling yaw relative to the wind coming from all directions relative to the nacelle, through keeping the nacelle at a fixed yaw angle, when the wind speed is above a predetermined value, and controlling the pitch angle of the blades depending on the yaw angle of the wind relative to the nacelle, and allowing the rotor to rotate freely.

One example of an embodiment of the present invention will be explained below referencing the drawings. The following is one example of an embodiment of the present invention, and does not limit the present invention.

The horizontal axis wind turbine of the present example of an embodiment is a downwind-type horizontal axis wind turbine, used in a wind power generator. FIG. 2 shows a plan view schematic diagram of the horizontal axis wind turbine. The horizontal axis wind turbine comprises a rotor 1, having a hub and three blades, a nacelle 2 that supports the rotor 1 through a main axle having a main axis 3 that horizontally extends through the hub, and a turbine holding member such as a tower (not shown) that supports the nacelle 2 so as to rotate freely in the yaw direction. Here the horizontal axis wind turbine is a horizontal axis wind turbine that can control the blade pitch angle, provided with an anemometer, an anemoscope, and a control device. While a device that controls the blade pitch angle for each blade independently can be used, it is adequate to be able to control all of the blades together.

Figure 2A:
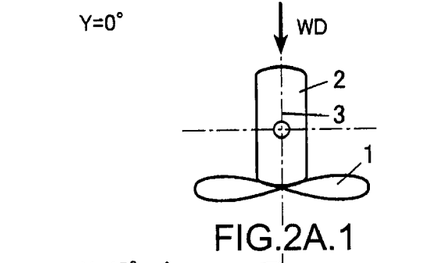
Figure 2A:
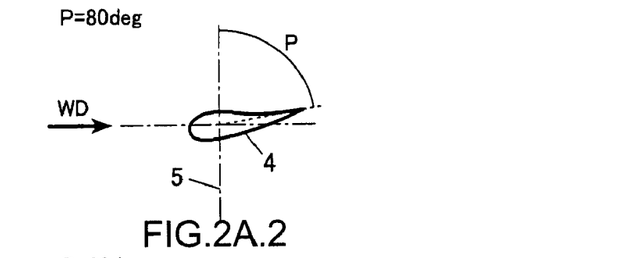
Figure 2B:
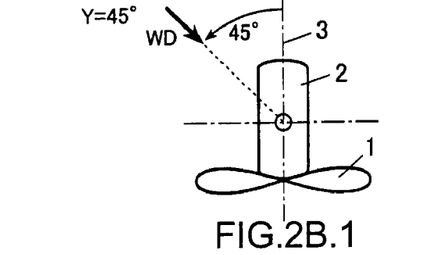
Figure 2B:
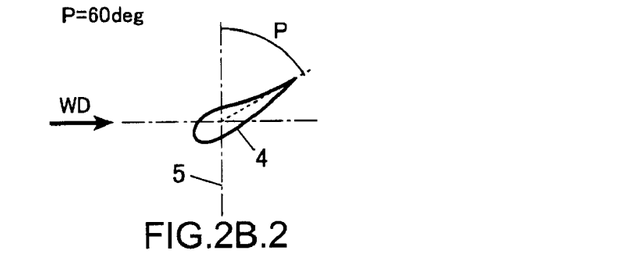
Figure 2C:
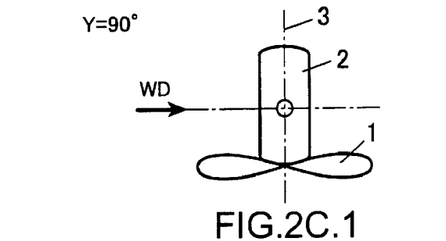
Figure 2C:
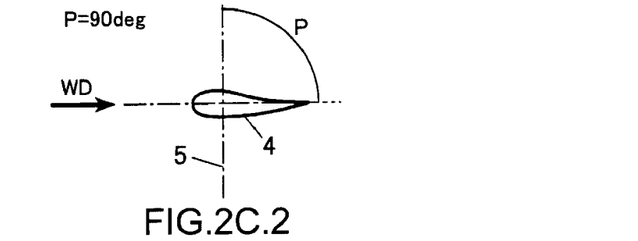
Figure 2D:
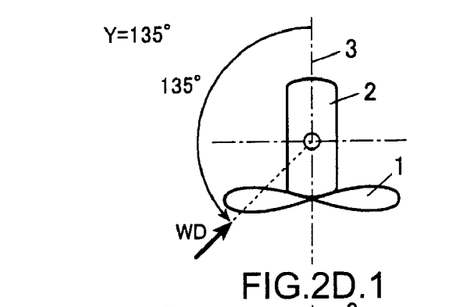
Figure 2D:
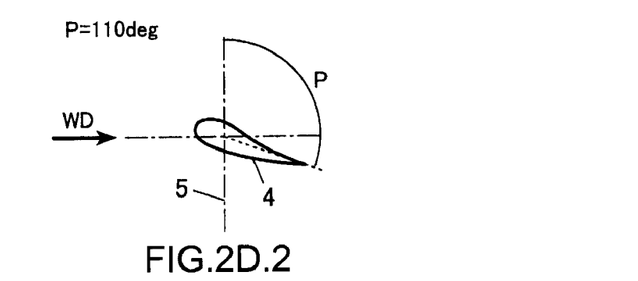
Figure 2E:
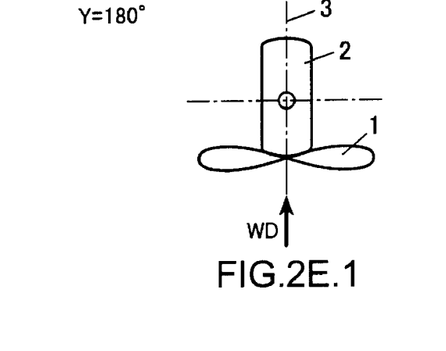
Figure 2E:
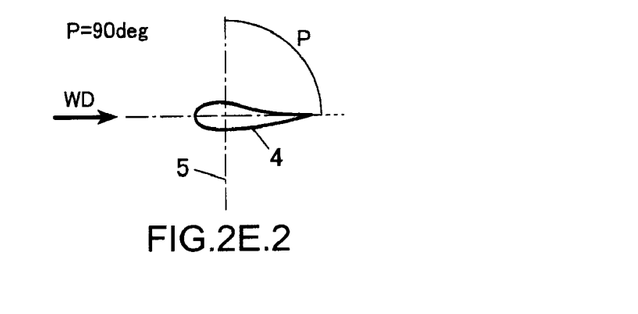

The anemometer, of course, measures the speed of the wind that is received by the horizontal axis wind turbine. The anemoscope is provided in the nacelle 2, and measures the yaw angle of the wind relative to the nacelle 2. The anemometer and anemoscope may be of any type. For example, the anemoscope may be of the type to perform the measurement based on yaw torque, based on deformation of the nacelle and turbine holding member, or based on the deformation of the blades, hub, or main axle along with the rotor azimuth angle.

Figure 1:
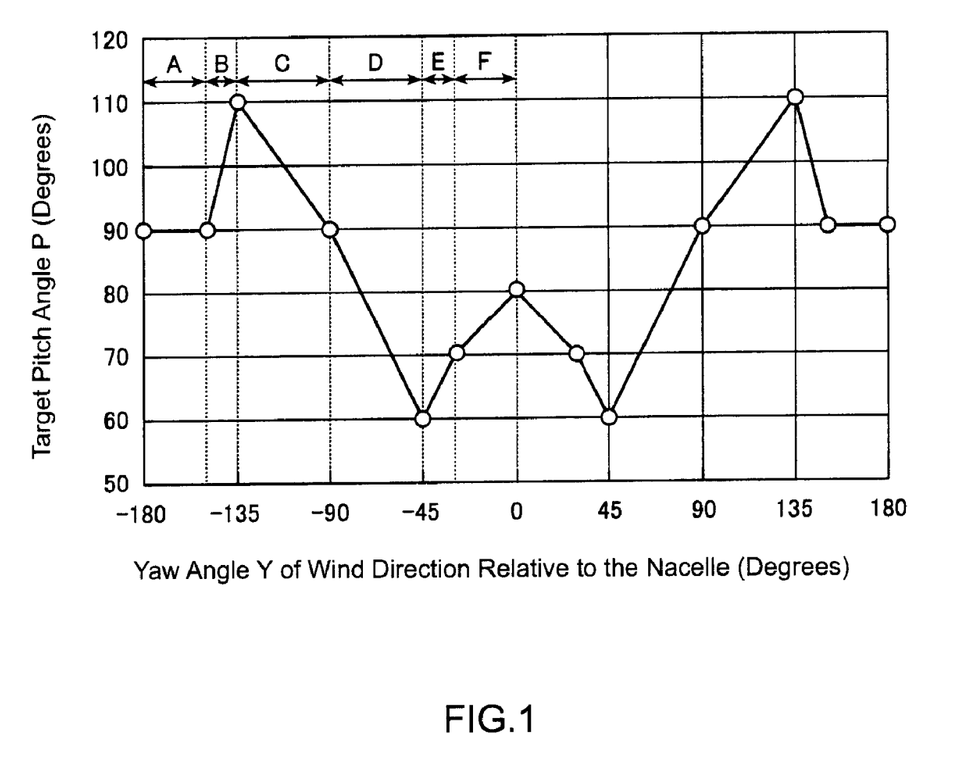
FIG. 1 is a graph showing the changes in the control target blade pitch angle P in one example of an embodiment according to the present invention.

The setting of the pitch angle to be used as the control target will be explained next in reference to FIG. 1. A graph showing the change in the blade pitch angle P (hereinafter termed the "target pitch angle P") that is the control target depending on the yaw angle Y (hereinafter termed the "yaw angle Y") of the wind relative to the nacelle is shown in FIG. 1. As is shown in FIG. 1, the target pitch angle P changes depending on the yaw angle Y. The graph showing the change has peaks at the yaw angles Y of 0°, ±45°, and ±135°, and varies with a line symmetry around a reference point of the yaw angle Y=0°. When the yaw angle Y=0, the target pitch angle is P=80°; when the yaw angle Y=±45°, the target pitch angle P assumes a minimum value of 60°; and when the yaw angle Y=±135°, the target pitch angle P assumes a maximum value of 60°. The scope of the control target values for the pitch angle is from the target pitch angle P corresponding to the yaw angle Y=±45° to the target pitch angle P corresponding to the yaw angle Y=±135°.

The target pitch angles P illustrated in FIG. 1 are values for the pitch angles selected to reduce the maximum load at each value of the yaw angle Y, selected through calculations by the inventors. In order to avoid fracturing or irreversible deformation of the various components in the wind turbine, it is necessary to select a pitch angle that reduces not only load at a specific location, but reduces the load in a balanced manner over all. It is understood that, in order to do this, the rotor should be allowed to rotate freely at an appropriate speed. It is understood that if the speed of free rotation of the rotor is too high, then the dynamic pressure (the load) will increase, whereas, conversely, if the rotor is held still, vibration (flutter) is likely to occur, which is undesirable from the perspective of load. Based on this, target pitch angles P have been established in advance, through experimentation and calculation, for 360° of the yaw angles Y.

In the graph shown in FIG. 1, in contrast to the region A, wherein the target pitch angle P is held at 90°, at the yaw angle Y=0°, the target pitch angle P is at 80°, and the graph is inclined in the region F so the target pitch angle P is not maintained at a constant value. This is because this was calculated for a model wherein the shape of the blade is not symmetrical in the forward-backward direction. Note that when the target pitch angle P=90°, it is necessary to keep in mind that the angle is not one wherein the torque on the rotor is necessarily zero. This also depends on the blade.

In the graph shown in FIG. 1, there is no point symmetry in the graph in the regions D, E, and F and the regions A, B, and C, around the points of the yaw angle Y=±90° and the target pitch angle P=90°. This is because the shape of the blade for which the calculations are performed, the pitch axle, and the stiffness are not symmetrical in the forward-backward direction. Blades that are asymmetrical in the forward-backward direction have system tendencies wherein there is excellent lift force with little tendency to vibrate when the wind is received from the front edge, but conversely, when the wind is received from the back edge, however, the lift force is small and vibration occurs readily.

The graph reaches culminations at the transition from region B to region C and the transition from region D to region E because the lift force is maximized in the vicinity of the yaw angle Y=±45° and the yaw angle Y=±135°, so that the load conditions are most severe. At yaw angle Y=±45°, the pitch angle required to distribute the load the most is about 60°, so the target pitch angle P is set to 60°. Because of the above, the target pitch angle P is as shown in FIG. 1. Insofar as the wind turbine is a three-blade wind turbine, these characteristics are not limited to downwind wind turbines, but also appear similarly in upwind wind turbines as well. For two-blade wind turbines, the characteristics are different from those shown in FIG. 1.

FIG. 2 will be referenced next to supplement regarding the yaw angle Y and the pitch angle. As a shown in FIG. 2A.1, when the wind direction WD is parallel relative to the axle of rotation 3 of the rotor 1, then the yaw angle Y=0°. According to the graph in FIG. 1, the target pitch angle P is 80° when the yaw angle Y=0°. The attitude of the blade 4 that is controlled to the target pitch angle P of 80° is shown in FIG. A.2. In FIG. 2, reference number 5 indicates the plane of rotation of the rotor.

FIG. 2B.1 shows the relationship between the wind turbine and the wind direction when the yaw angle Y=45°. According to the graph in FIG. 1, when the yaw angle Y=45°, the target pitch angle P is 60°. The attitude of the blade 4 that is controlled to the target pitch angle P of 60° is shown in FIG. 2A.2. In the same manner, after this, the relationships between the wind turbine and the wind direction when the yaw angle Y=90°, 135°, and 180° are shown sequentially in FIGS. 2C.1, D.1, and E.1, and the orientations of the blade 4, controlled to the target pitch angle P in accordance with each yaw angle, are shown in FIGS. 2C.2, D.2, and E.2. Although the yaw angle Y and the reference direction for the blade pitch angle are discretionary, the graph shown in FIG. 1 is according to the criteria described above.

Figure 3:
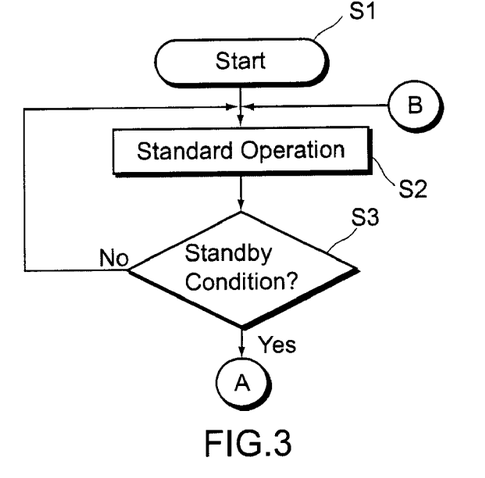
FIG. 3 is a basic flowchart of the control in one example of an embodiment according to the present invention.
Figure 4:
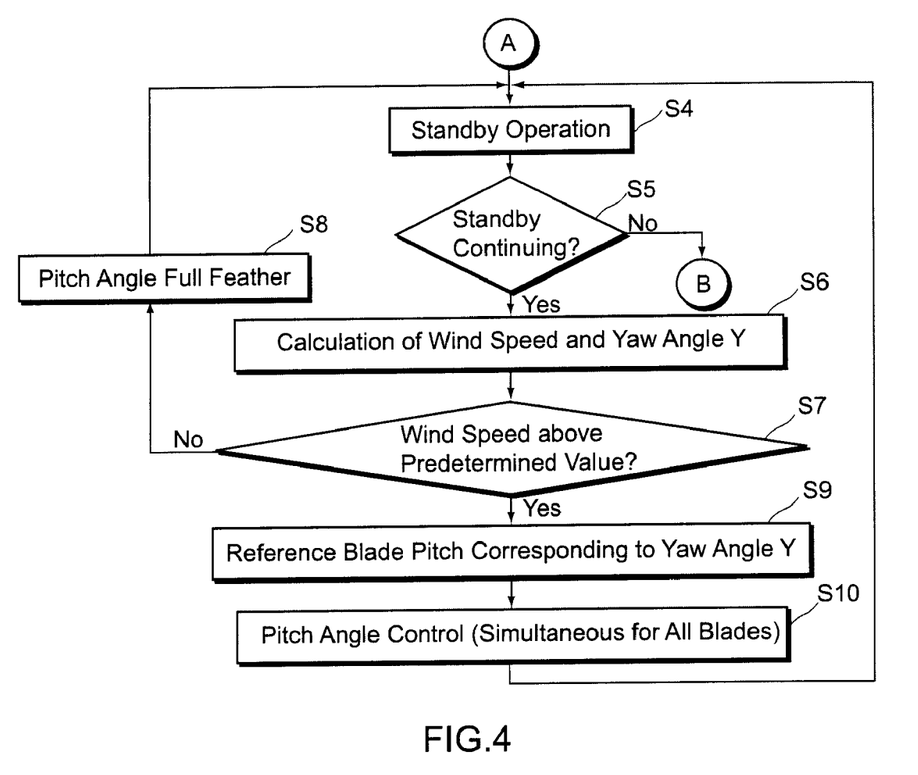
FIG. 4 is a flowchart of the control when in standby in one example of an embodiment according to the present invention.

The control will be described next in reference to FIG. 3 and FIG. 4. FIG. 3 is a basic flow chart, and FIG. 4 is the flowchart when in standby. When the control device that is provided in the horizontal axis wind turbine begins its control (S1), the measurement value from the anemometer that is provided in the horizontal axis wind turbine is obtained to monitor and assess whether or not there are standby conditions (S3), and if standby conditions do not apply, then a standard operation is performed (S2). Here, one example of a standby condition is that the wind speed has been in excess of 25 m/sec for more than 10 minutes. A standard operation is the generation of electricity by the generator to which the rotor is attached. If YES in Step S3, then the control device starts standby operation (S4). In standby operation, the nacelle 2 yaw angle is held constant by the yaw brake 2, and the rotor 1 is allowed to rotate freely. That is, the power generation is stopped, the main axle brake is released, and the load is removed from the rotor 1.

Additionally, in standby operation, the measurement values are obtained from the anemometer and the anemoscope provided in the horizontal axis wind turbine (S6) and monitoring and assessment is performed as to whether or not the standby operation should continue (S5), and whether or not the wind speed is above a predetermined value (S7). Here the condition for whether to continue the standby operation may be the same as the standby condition described above (that the wind speed is greater than 25 m/sec for more than 10 minutes), or, as a more stable condition, it may be, for example, that the wind speed is greater than 20 m/sec for more than 10 minutes. Additionally, one example of a predetermined value is that the wind speed is 30 m/sec for more than 10 minutes. In any case, the condition would be higher than the aforementioned standby condition. If NO in step S5, then processing returns to the main flow in FIG. 3. If YES in Step S5 and NO in Step S7, that is, if the wind speed is less than the predetermined value, then the control device performs a control so as to feather all of the blades (S8). In this way, if the wind speed is less than the predetermined value during standby operation, then all of the blades are controlled so as to be feathered, regardless of the yaw angle Y.

If YES in Step S7 (that is, if the wind speed is greater than the predetermined value), then the control device controls the blade pitch angle depending on the yaw angle Y, and causes the rotor to rotate freely. Specifically, the control device controls the blade pitch angle so that all of the blades will have the target pitch angle P illustrated in FIG. 1 (S10). To achieve this, the control device references target pitch angle P data that is stored in a memory area to obtain the target pitch angle P corresponding to the measured yaw angle Y (S9).

Examples of the Embodiments

Figure 5:
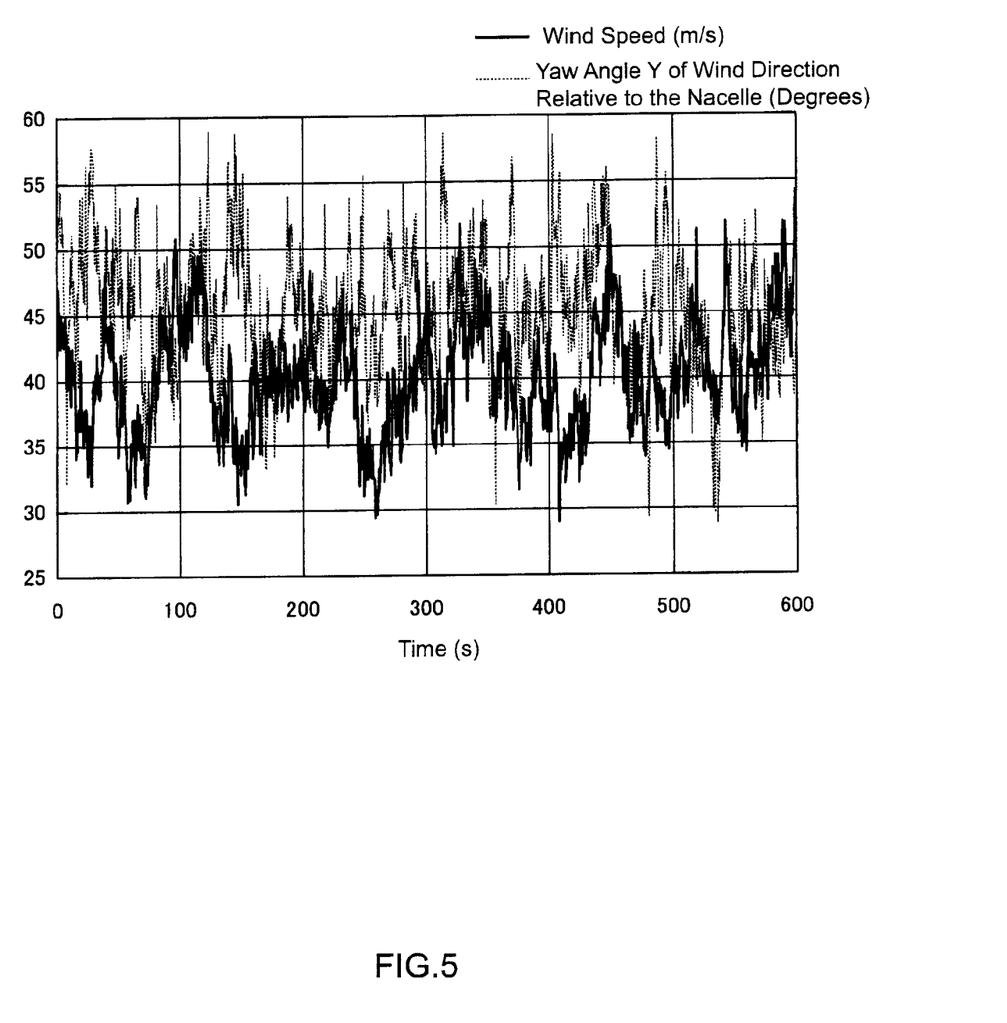
FIG. 5 is a graph showing the changes over time in the wind conditions in the example of an embodiment.

The results of simulations for specific wind conditions for an example of the present invention and for a conventional example will be described here. Turbulent wind conditions of an average wind speed of 40 m/sec with an average yaw angle Y of 45° are envisioned, as shown in FIG. 5. The changes in wind conditions over a 10-minute period, shown in FIG. 5, were the subject of the calculations. In the present example invention, according to the example of the embodiment described above, the yaw is held constant under these wind conditions, and with a control period of 10 minutes, the blade pitch angle is fixed at 60°.

Figure 6:
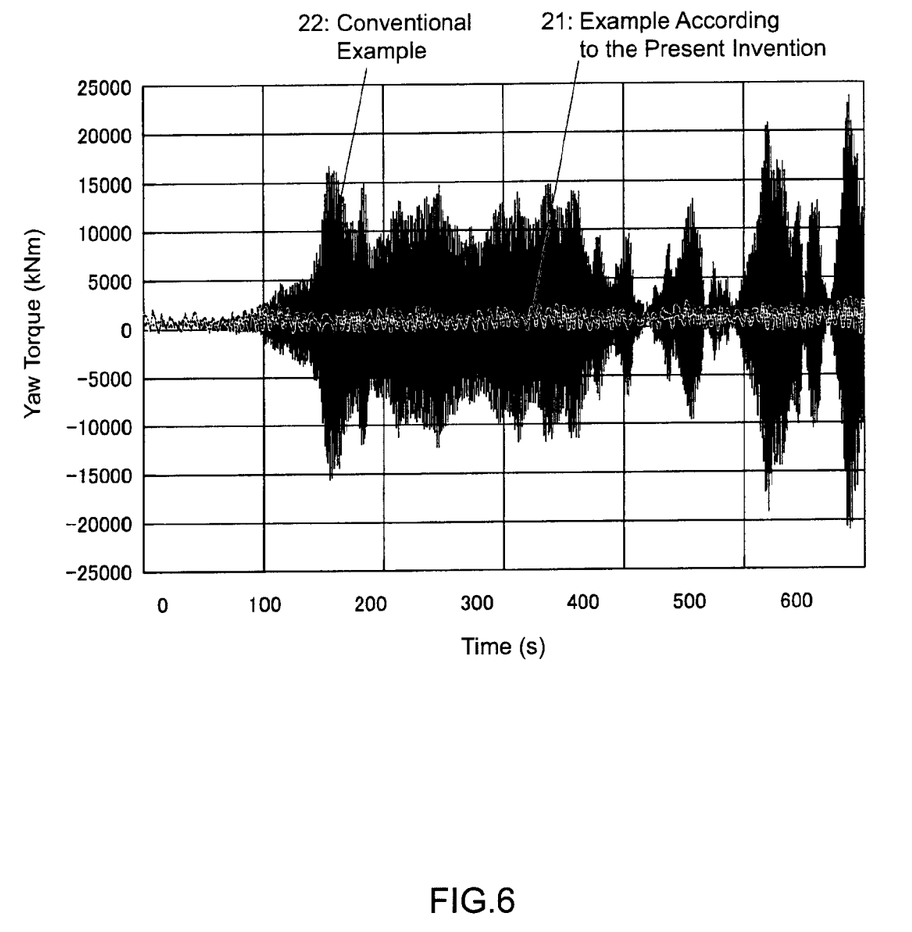
FIG. 6 is a graph showing the changes over time in the yaw torques in the example of the invention and in the conventional example.

On the other hand, in the conventional example, the yaw is fixed under the same wind conditions, and the blades are fixed in a feathered condition. The histories of the yaw torques in the example in the present invention and the conventional example are shown in FIG. 6. The yaw torque 21, over the entire time period, in the example of the present invention is greatly reduced, to about ⅛ relative to that of the yaw torque 22 in the conventional example.

Figure 7:
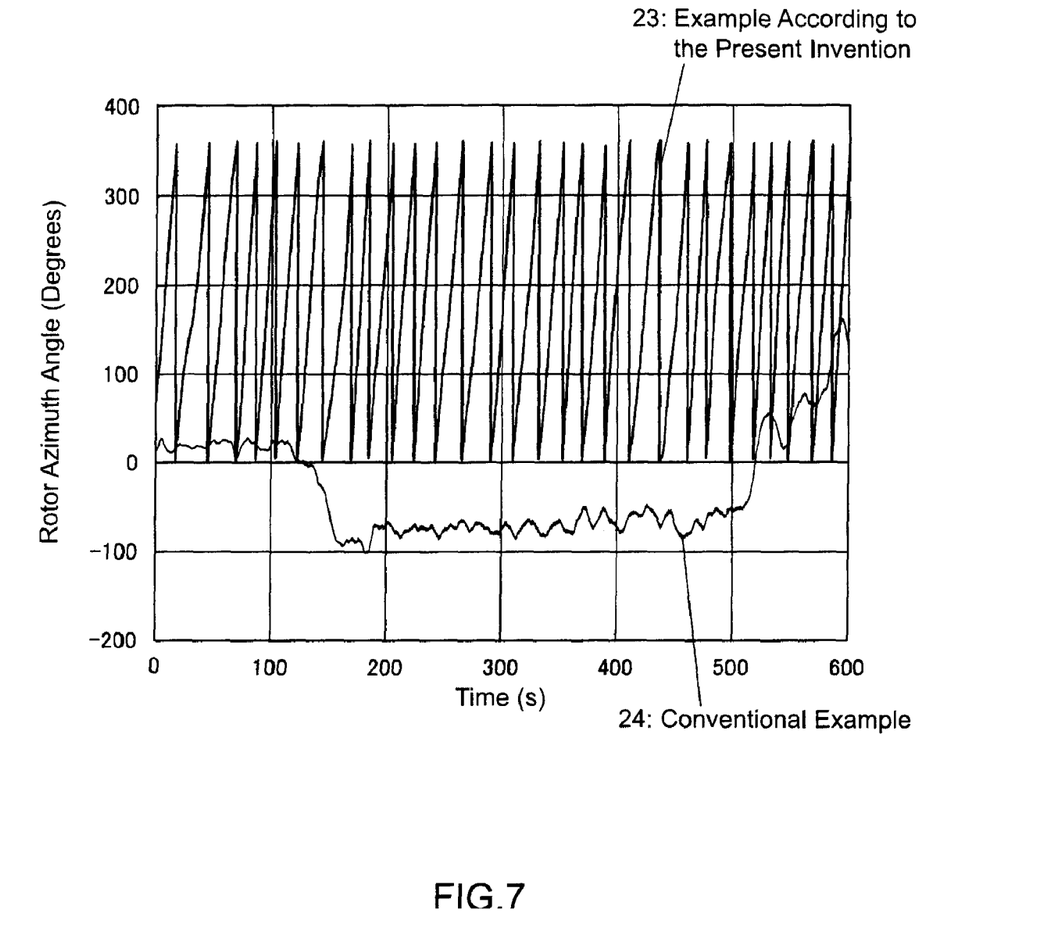
FIG. 7 is a graph showing the changes over time in the rotor azimuth angles in the example of the invention and in the conventional example.

The histories of the rotor azimuth angles in the example in the present invention and the conventional example are shown in FIG. 7. It can be seen in FIG. 7 that although in the conventional example the rotor was essentially stationary, in the example of the present invention the rotor constantly rotated freely. Stall flutter occurs in the state wherein the rotor is essentially stationary. With the present invention, the pitch angle can be controlled depending on the yaw angle Y, which can cause the rotor to steadily rotate freely, which can thereby reduce the load by making it possible to avoid flutter even at a yaw angle

What is claimed is:

1. A horizontal axis wind turbine comprising:
a turbine holding member;
a nacelle held by the turbine holding member such that the nacelle is rotatable in a yaw direction;
a main axis rotatably supported by said nacelle, having an extended portion extending essentially in a horizontal direction from the nacelle; and
a rotor having a hub mounted to said extended portion of the main axis and a blade extending outwardly from the hub;
wherein when a wind speed is above a predetermined value, a yaw angle of the nacelle is fixed, a pitch angle of the blade is controlled in accordance with a yaw angle of a wind direction relative to the nacelle, and the rotor is allowed to rotate freely.

2. A horizontal axis wind turbine according to claim 1, wherein, when the wind speed is less than the predetermined value and predetermined standby conditions are met, all blades are controlled to feather.

3. A horizontal axis wind turbine according to claim 2, wherein, when the wind speed is more than the predetermined value the blade pitch angle is controlled to avoid a concentration of load.

4. A horizontal axis wind turbine according to claim 3, wherein:
there are three of said blades; and
when the wind speed is greater than the predetermined value, the scope of control target values for the pitch angle ranges from a control target value for the pitch angle corresponding to a yaw angle of ±45° for the wind direction relative to the nacelle, to a control target value for the pitch angle corresponding to said yaw angle of ±135°.

5. A horizontal axis wind turbine according to claim 2, wherein:
there are three of said blades; and
when the wind speed is greater than the predetermined value, the scope of control target values for the pitch angle ranges from a control target value for the pitch angle corresponding to a yaw angle of ±45° for the wind direction relative to the nacelle, to a control target value for the pitch angle corresponding to said yaw angle of ±135°.

6. A horizontal axis wind turbine according to claim 1, wherein, when the wind speed is more than the predetermined value the blade pitch angle is controlled to avoid a concentration of load.

7. A horizontal axis wind turbine according to claim 6, wherein:

there are three of said blades; and when the wind speed is greater than the predetermined value, the scope of control target values for the pitch angle ranges from a control target value for the pitch angle corresponding to a yaw angle of ±45° for the wind direction relative to the nacelle, to a control target value for the pitch angle corresponding to said yaw angle of ±135°.

8. A horizontal axis wind turbine according to claim 1, wherein:

there are three of said blades; and when the wind speed is greater than the predetermined value, the scope of control target values for the pitch angle ranges from a control target value for the pitch angle corresponding to a yaw angle of ±45° for the wind direction relative to the nacelle, to a control target value for the pitch angle corresponding to said yaw angle of ±135°.

9. A horizontal axis wind turbine as set forth in claim 8, wherein:

when the wind speed is greater than the predetermined value, the control target value for the pitch angle corresponding to a yaw angle of ±45° of the wind direction relative to the nacelle is set as the minimum value for the control target value.

10. A horizontal axis wind turbine as set forth in claim 8, wherein:

when the wind speed is greater than the predetermined value, the control target value for the pitch angle corresponding to this yaw angle being ±135° is set as the maximum value for the control target value.

11. A horizontal axis turbine as set forth in claim 1, wherein the pitch angle of the blade is controlled in accordance with the yaw angle of a wind direction relative to the nacelle based on a predetermined relationship between the pitch angle and the yaw angle to reduce load on the horizontal axis wind turbine.

* * * * *